(12) United States Patent
Greenwood

(10) Patent No.: US 7,559,146 B2
(45) Date of Patent: Jul. 14, 2009

(54) WIRE MESH FILTER WITH IMPROVED HOOP STRENGTH

(75) Inventor: George Greenwood, Tiverton, RI (US)

(73) Assignee: ACS Industries, Inc., Lincoln, RI (US)

( * ) Notice: Subject to any disclaimer, the term of this patent is extended or adjusted under 35 U.S.C. 154(b) by 0 days.

(21) Appl. No.: 12/287,367

(22) Filed: Oct. 8, 2008

(65) Prior Publication Data

US 2009/0079104 A1 Mar. 26, 2009

Related U.S. Application Data

(62) Division of application No. 11/204,678, filed on Aug. 16, 2005, now Pat. No. 7,435,280.

(60) Provisional application No. 60/602,194, filed on Aug. 17, 2004.

(51) Int. Cl.
*B23P 15/00* (2006.01)
*B01D 39/12* (2006.01)

(52) U.S. Cl. .................. 29/896.62; 29/902; 55/526; 55/DIG. 5; 55/DIG. 43; 264/103; 264/294; 264/320; 280/742

(58) Field of Classification Search ............... 55/385.3, 55/525, 526, DIG. 5, DIG. 43; 280/736, 280/740, 741, 742; 66/190, 202; 264/103, 264/294, 320; 29/896.6, 896.62, 902; 72/368, 72/370.27
See application file for complete search history.

(56) References Cited

U.S. PATENT DOCUMENTS

| | | | | | |
|---|---|---|---|---|---|
| 3,690,606 | A | * | 9/1972 | Pall | 428/605 |
| 3,985,076 | A | * | 10/1976 | Schneiter et al. | 102/531 |
| 4,017,100 | A | * | 4/1977 | Gehrig et al. | 280/736 |
| 4,683,010 | A | * | 7/1987 | Hartmann | 148/287 |
| 4,902,036 | A | * | 2/1990 | Zander et al. | 280/736 |
| 5,204,068 | A | * | 4/1993 | O'Loughlin et al. | 422/180 |
| 5,248,162 | A | * | 9/1993 | Levosinski et al. | 280/740 |
| 5,318,323 | A | * | 6/1994 | Pietz | 280/736 |
| 5,449,500 | A | * | 9/1995 | Zettel | 422/179 |
| 5,478,109 | A | * | 12/1995 | Faigle et al. | 280/736 |
| 5,525,170 | A | * | 6/1996 | Stark et al. | 149/85 |
| 5,585,597 | A | * | 12/1996 | Faigle et al. | 102/530 |
| 5,673,483 | A | * | 10/1997 | Hock et al. | 29/896.62 |
| 5,681,056 | A | * | 10/1997 | Levosinski | 280/742 |
| 5,702,494 | A | * | 12/1997 | Tompkins et al. | 55/498 |
| 5,816,612 | A | * | 10/1998 | Faigle et al. | 280/740 |
| 5,849,054 | A | * | 12/1998 | Fujisawa | 55/486 |
| 5,908,481 | A | * | 6/1999 | Siddiqui | 55/485 |
| 5,938,236 | A | * | 8/1999 | Tanaka et al. | 280/741 |
| 6,116,643 | A | * | 9/2000 | Katsuda et al. | 280/741 |
| 6,196,581 | B1 | * | 3/2001 | Katsuda et al. | 280/736 |
| 6,234,521 | B1 | * | 5/2001 | Katsuda et al. | 280/736 |
| 6,276,717 | B1 | * | 8/2001 | Katsuda et al. | 280/736 |
| 6,277,166 | B2 | * | 8/2001 | Zettel et al. | 55/385.3 |
| 6,409,214 | B2 | * | 6/2002 | Katsuda et al. | 280/741 |
| 6,695,345 | B2 | * | 2/2004 | Katsuda et al. | 280/736 |
| 6,840,977 | B1 | * | 1/2005 | Fukunaga et al. | 55/526 |
| 2001/0007189 | A1 | * | 7/2001 | Zettel et al. | 55/385.3 |
| 2006/0103122 | A1 | * | 5/2006 | McFarland | 280/736 |

\* cited by examiner

*Primary Examiner*—Duane Smith
*Assistant Examiner*—Robert A Clemente
(74) *Attorney, Agent, or Firm*—Maurice M. Klee

(57) ABSTRACT

A compressed wire mesh filter for an airbag assembly has one or more wires wrapped around the outer perimeter of the filter prior to final compression of the mesh to increase the hoop strength of the filter.

11 Claims, 7 Drawing Sheets

107

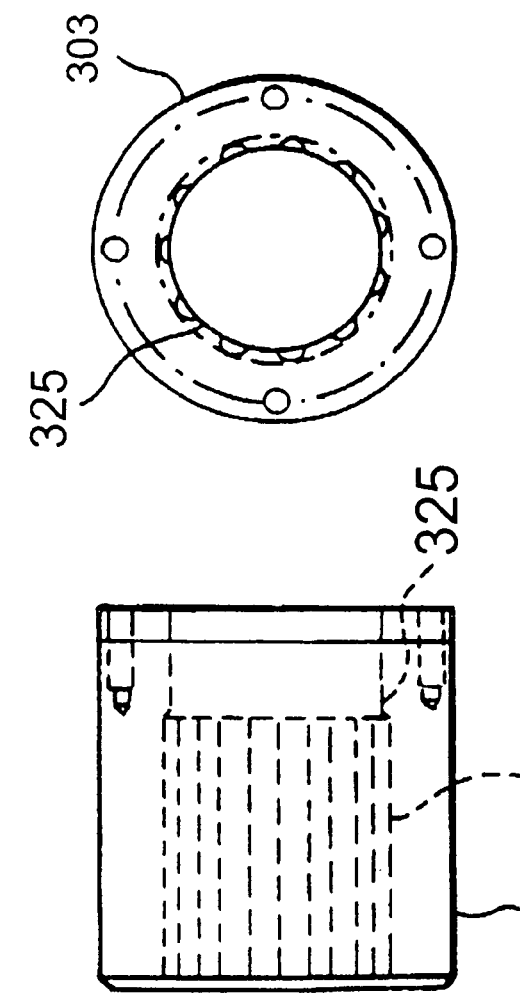
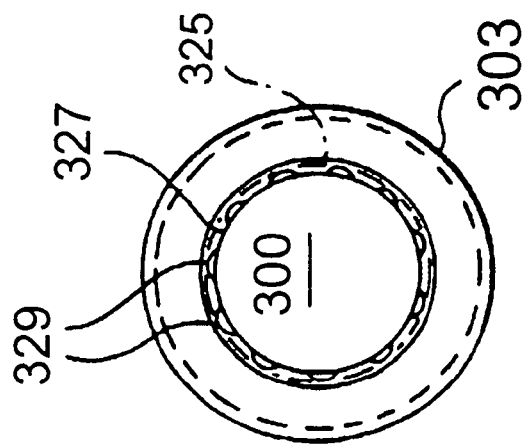
FIG. 3E
FIG. 3C
FIG. 3D

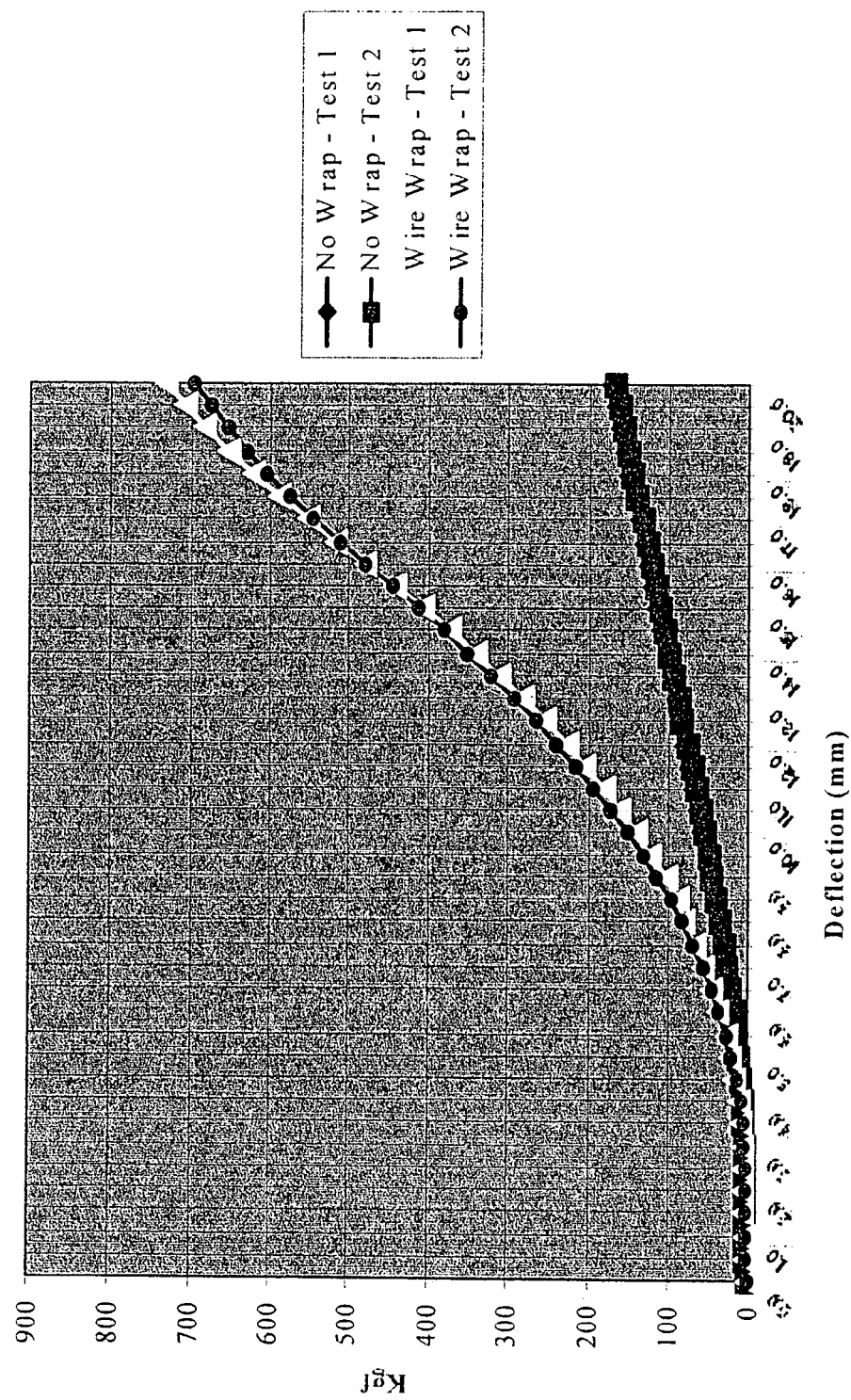

WIRE MESH FILTER WITH IMPROVED HOOP STRENGTH

CROSS REFERENCE TO RELATED APPLICATIONS

This is a divisional application under 35 USC § 120 of U.S. application Ser. No. 11/204,678 filed on Aug. 16, 2005, which claims the benefit under 35 USC § 119(e) of U.S. Provisional Application No. 60/602,194 filed on Aug. 17, 2004, the contents of both of which in their entireties are hereby incorporated by reference.

BACKGROUND OF THE INVENTION

1. The Field of the Invention

This invention relates to filters, and especially filter elements useful for filtering hot gases used in the deployment of passenger airbags, and to methods for making and using such filters, and to airbags and vehicles containing the same.

2. The State of the Art

Relatively recent concerns with passenger safety in land vehicles has led to the development of "airbag" technology, a passive restraint and protection system comprising a bag or pillow-like bladder that is inflated in an extremely short period of time using compressed or chemically-generated gas to fill the bag. The inflated bag is disposed or deployed on an interior portion of the vehicle's passenger compartment, between that portion and the front or side of the passenger.

The first generation of pyrotechnic airbag vehicle occupant restraint systems used azide compositions (typically sodium azide, $NaN_3$, mixed with a heavy metal oxide) to generate the gas used to inflate the airbag. These explosive compositions generate a gas at over 1,000° F. during the initial phase of the gas generation reaction. A large amount of condensable, molten, and/or solid particulate matter is generated concurrently with the gas in this reactive generator. Much of this matter is not only extremely hot but also of a caustic composition, and the particulate matter, travelling at a high velocity, is potentially dangerous to the integrity of the bag and the occupant to be protected thereby. Some airbag designs included large vent holes in the bags for venting the gas into the passenger compartment, and so the gas used to inflate these bags must be filtered to prevent the particulates from entering the passenger compartment along with the vented gas. In this type of design, all of the gas generated escapes the reaction chamber and is propelled towards the airbag, so that the gases and any particulates inevitably impinge at least on the bag itself if no filter were present. If no measures are taken to ameliorate the degradative effects of this mixed phase reaction mixture product, the gases and particulates generated would penetrate the bag, likely causing its failure and, in the most serious situations, causing injuries to the passenger.

Various measures were taken to reduce the degradative effects of the gas, some of which are discussed in U.S. Pat. Nos. 4,902,036 and 5,318,323, both of which are incorporated herein by reference. One technique for reducing the degradative effects was the use of sacrificial layers to slow down the particulate material, and the use of static centrifugal or impingement-type particle separation techniques. The art also resorted to using denser and/or longer filter devices. With these approaches, there is a design trade-off between filtering the gases and providing a pressure drop small enough to avoid interfering with (slowing down) the rate at which the airbag inflates. There are other trade-offs, as particulate deflection devices are typically expensive machined parts fabricated from heavy steel plate; because they are not amenable to fabrication by stamping, their cost of manufacture is increased. In general, the airbag designers had to contend with removing condensed solid poisonous products (usually unreacted sodium azide and sodium oxides produced in the reaction), cooling the gases before they inflated the cushions, and providing a homogeneous and uniformly distributed gas flow generated from an explosive source.

Many filtering devices used today comprise layers of metal screens of various mesh sizes and one or more layers of a non-combustible fibrous material packed between the screens. The efficiency of this type of filter is dependent upon how tightly the material is packed; a tighter packing leads to more efficient filtering but also to a higher pressure drop. According to the above-referenced '323 patent, there is also a problem with quality control in the mass fabrication of such screen-mat composites with respect to providing a uniform pressure drop across any given filter made.

Yet another problem in designing airbag filter devices is that as the filter becomes clogged, the pressure drop across the filter increases. Accordingly, the mechanical stresses on the filter are increased, and the gas and particulates move through the filter at a higher velocity, necessitating an improved filter strength and toughness to withstand the higher flow rate through, pressure drop across, and particulate velocity into the filter.

Besides the aforementioned patents, typical filters for airbags are made from a compressed wire mesh or steel wool, such as described in U.S. Pat. No. 3,985,076 (metallic mesh), EP 674,582 (sintered metallic fiber structure), U.S. Pat. No. 4,017,100 (multilayer structure of glass fibers, steel wool, and screens and perforated plates), DE 2,350,102 (glass wool), GB 2,046,125 (metal spheres partially sintered together to form a rigid, porous body), U.S. Pat. No. 5,204,068 (metal fiber felt comprising coated fibers, such as nickel, coated with silicon compounds), WO 94/14608 (metal wire mesh to which a non-woven web of metal fibers is bonded by sintering), and others, the disclosures of which are all incorporated herein by reference. The gas generating composition, often an azide (azoimide) composition with copper, generates hot gases and particles of copper slag. The desire of the designer is to filter the copper slag particles so that the molten metal droplets do not impinge the airbag. The final filter design became a trade-off between (i) having a sufficiently high density of filter material to catch the slag particles, (ii) providing sufficient mass in the filter to cool the filtered slag particles before they melt through the mesh or wool elements of the filter or fragment into smaller droplets that might do the same, and (iii) the total density and weight constraints of the filter. That is, if the filter is made of very fine wire mesh or wool to assure catching all of the molten slag particles, then the mesh or wool fibers will have insufficient mass to cool the impinging slag particle to a solid, and so the molten slag particle melts through the mesh or wool and/or it fragments into smaller particles that may eventually pass through the filter and impinge and burn through the airbag onto the occupant.

The new generation of gas generators employ cleaner and less toxic non-azide gas-generating compositions (e.g., as described in U.S. Pat. No. 5,525,170, disclosure of which is incorporated herein by reference) that provide relatively more gas than the azide-based compositions. While the need to filter the gas generated is thus less of a concern, federal government standards exist setting limits on the allowable amounts of soluble and insoluble particulates in the gas generated, and so there is still a need to filter the gas. The need to cool the gas generated is still a necessary step in the deployment of the airbag. Moreover, these newer generation gas generators still yield a significant explosive force against which the filter element must be stabilized.

As more forceful gas-generating devices are used for deploying airbags, there is a need for the filter to withstand a greater explosive force. U.S. Pat. No. 6,277,166, the disclosure of which is incorporated herein by reference, describes forming a wire mesh where the mold forces a portion of the mesh into ribs that increase the hoop strength of the filter. These ribs extend outward from the filter, increasing the diameter of the filter. Because the chamber in which the filter is inserted is of a fixed and limited size, especially in a vehicle steering wheel where space is limited, the main body of such a filter must be smaller to accommodate the ribs.

During airbag deployment, when an explosive charge in the inner diameter of the filter is ignited, the explosion gases pass through the filter and then through holes in a mating housing that are connected so as to inflate the airbag. To increase the hoop strength of the filter, some airbag manufacturers have used a perforated or expanded metal band to bolster the hoop strength of the wire mesh filter. There is a concern that fracture or expansion of this metal band could block the holes in the mating housing, effectively turning the airbag into a bomb, with serious consequences for the vehicle occupants.

SUMMARY AND OBJECTS OF THE INVENTION

In light of the foregoing, objects of this invention include increasing the hoop strength of knitted wire mesh filters while substantially utilizing the space allotted for the filter in the particular application, improving the filtering characteristics, and improving the heat sink capacity of the filter, without introducing significant additional manufacturing costs or operations or adversely affecting the filtering and heat sink properties of the filter, and without the need for the use of a perforated or expanded metal band that might fail.

In one embodiment, this invention provides a wire mesh filter comprising a compressed wire mesh forming an annulus and having at least one hoop wire around the outside of the filter and interlocked with the wire mesh when the filter is compression molded.

In another embodiment, this invention provides a process of making such a wire mesh filter by providing a knitted wire mesh tube or preslug, wrapping at least one hoop wire around the outside of the tube and/or preslug, inserting the wrapped tube or preslug into a mold, and compressing the wrapped tube or preslug in the mold to produce a compressed wire mesh annulus having said hoop wire interlocked into the mesh during the molding process.

BRIEF DESCRIPTION OF THE FIGURES

FIGS. 3A, 3B, 3C, 3D, and 3E depict examples of a plunger and a combination female mold and mandrel, respectively, for this invention, as well as those suitable for making a filter having outer ribs.

FIGS. 5 and 6 are graphs showing the results of comparative testing.

DETAILED DESCRIPTION OF SPECIFIC EMBODIMENTS

Figure 1:
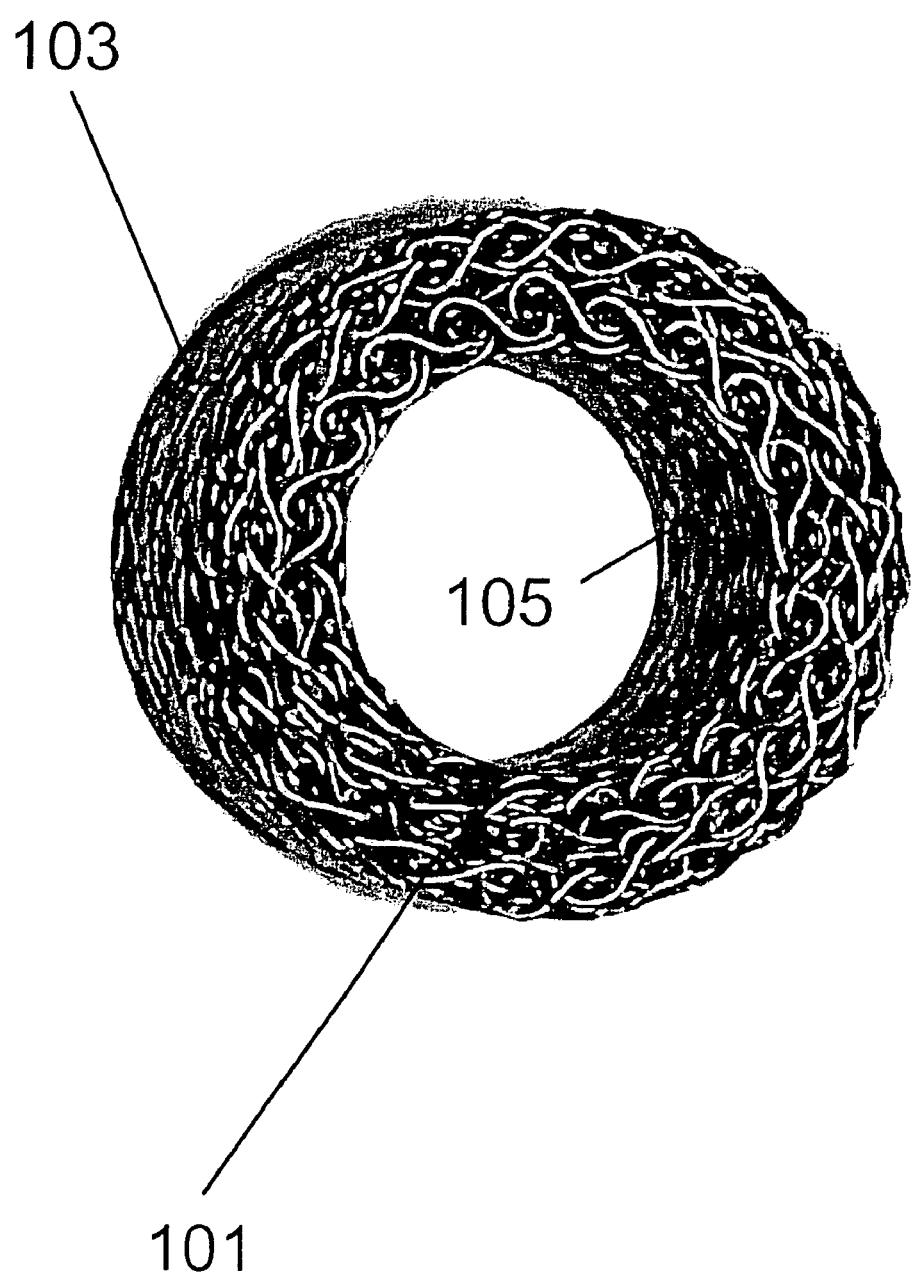
FIG. 1 is an essentially plan photographic view along the axis of the annulus of a filter made according to this invention.

In brief, wire of a particularly chosen type and diameter is knitted into a knit mesh tube or sleeve having a particular width and density for the filtering application desired. A piece of the mesh tube is cut to a particular weight as a function of the weight and filtering requirements of the environment and fluid to be filtered. The mesh tube is then compression molded (pressed) into the desired shape of the filter; for an annulus, the mold use a female mold, a mandrel, and a plunger or press to produce a filter having an annulus with the desired physical dimensions, weight, and density.

The preferred filter elements in the present invention comprise a wire mesh, most preferably knitted, and then compressed into a desired geometry, preferably annular, circular, or elliptical (oval), although rectilinear geometries, such as triangular, square, and octagonal annuli are also possible. The mesh is preferably produced by a conventional wire knitting machine (such as any commercially available wire mesh knitter, as are available from, for example, Tritech International, England); examples of wire meshes and knits used as seals and support mats in high temperature applications can be found in U.S. Pat. Nos. 4,683,010 and 5,449,500, the disclosures of which are incorporated herein by reference. The wire knitting machine typically produces a pliable mesh sleeve or tube and is very much like a conventional knitting machine but for the larger knitting needles.

The wire used to make the mesh can be any of various compositions, and preferably is selected from stainless steels, including austenitic and nickel alloys, such as, but not limited to, 304, 309, and 310 grades of stainless steel, or combinations thereof. The composition of the wire is chosen to be chemically compatible (to the extent possible) with the environment in which the filter is disposed and with the fluid (or mixed phases) being filtered. Accordingly, other metals, and even polymeric fibers, can be used, depending upon the environment and the properties of the materials being filtered, and to the extent that such can be formed into a compressed filter, and in certain preferred embodiments one having ribs spaced along its outer circumference.

The wire for the mesh used for fabricating airbag filters preferably ranges from about 0.03 in. dia. to about 0.002 in. dia. (from about 0.75 mm to about 0.05 mm in diameter, or from about 21 to about 47 gauge (Brit. Std.); although larger and/or smaller wire can be used). If multiple meshes are used together in a single filter, it is preferred that the largest diameter wire be used for the innermost filter zone(s) and that smaller gauge wires be used for the outermost filter zone(s), and that the wire size decrease in the radially outward direction. As mentioned above with respect to an airbag filter, the explosive charge releases particulates of molten metal (slag) that impinge the filter. The use of a thicker mesh wire and/or a denser radially interior portion tends to ameliorate the deterioration of the filter due to the corrosive explosion mixture. For example, near the center of the filter where the charge explodes and slag is formed that impinges the filter; a thicker wire (a) has a higher strength than a thinner wire to better absorb the explosive force and (b) has a greater effective heat capacity that can tolerate a larger and/or hotter slag particle better than a relatively thinner wire (e.g., before a molten slag particle burns through the wire).

The wire used for the entire filter, or any of the individual parts or sections of the filter, can be round or flat in cross-section. The wire used also can be a combination of two or more different geometries and/or compositions of wire. Different types, diameters, and/or geometries of wire can be knit into a single mesh to provide a mesh having a uniform composition of different wires or a composition of wires that changes along the length of the mesh tube. Further, additional strength can be obtained by heat treating; e.g., annealing the filter in an oxygen-containing atmosphere (such as ambient); such an annealing process is described in the aforementioned U.S. Pat. No. 5,449,500 (the disclosure of which is incorporated herein by reference). The same wire can be used for two different sections of the filter and compressed or compacted to provide a different density in each section. Likewise, different wires (regarding geometry and/or composition) can be used to produce different filter sections each having the same density. Besides a wire mesh and steel wool, one or more sections of the filter can include other types of wire filter media (such as those commercially available from Memtec, Ltd., Australia). Such media may also comprise a compacted and/or annealed wire mesh, and if obtained separately, can be fabricated into a desired shape (e.g., a strip cut and welded into a circular loop) before being integrated with the compressed mesh of the present invention.

The density of the filter is typically specified by the designer of the entire airbag assembly. Knowing the volume of the filter (or the volume available for the filter, a design constraint based, for example, on the steering wheel size and configuration), and the specific density of the wire (stainless steel typically has a density of about 0.29 lb./in$^3$ (about 8.03 g/cc)), the density of the filter can be determined. Thus, for any particular zone of the filter having a specified density, the weight of mesh required to fit into that filter zone volume can be calculated from the density.

It is preferred that the final filter article be made in a series of compressions starting with the knit wire tube. As has been noted, the density of the final filter is a design parameter of the air bag assembly. When it is desired to provide a filter having an essentially uniform density, it is preferred that the filter be formed in a series of compressions. In the first compression, the predetermined, desired amount of knit wire tube is pressed into an annulus using a cylindrical female mold with a mandrel (to provide the outer and inner diameters of the annulus) and a plunger in the geometry of a sleeve to force the knit tube into the space between the mandrel and the female mold. In the mold, this intermediate article, a preslug or preform, can be defined with reference to "base" end at the bottom of the mold, and a "work" end contacted by the plunger. Typically, for example, 14 inches of knit wire tube is compressed into a 3½ to 4 inch high annulus (measured along the axis of the annulus).

To diminish the compression, and thus uneven density, that is likely to occur, the work end of the preslug is placed first into the mold so that it becomes the base end in the next operation; that is, the intermediate article is flipped-over so that it is compressed from the opposite end than it was originally. In this next step, the 3½ to 4 inch preslug is compressed into an annulus about one to two inches in length (again measured along the axis of the annulus). To facilitate this second compression molding step, the dimensions of the mold used in the first compression molding step should provide an annulus having a larger I.D. and a smaller O.D. than the final article, so that the preslug easily fits over the mandrel and into the mold used to make the final article. Presses delivering 70 to 80 tons of pressure, and possibly up to 100 tons, are required to deform the mesh and produce these articles. It can be seen that the mesh could be compressed from opposing ends simultaneously, although such pressing can provide a parting line, or density gradient along the axis, with the least dense areas towards the center. The intent is to provide a compressed filter with a reasonably uniform density, and so it is preferred to compress in two stages as described above.

Figure 4A:
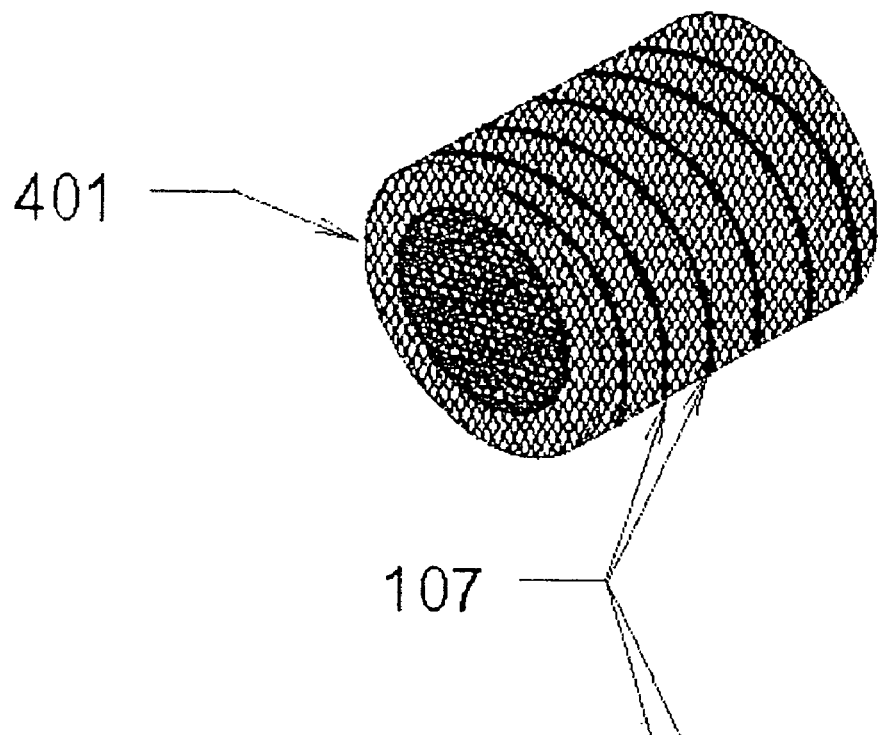
FIGS. 4A and 4B are idealized perspective and side views of the preslug with the hoopwire.
Figure 4B:
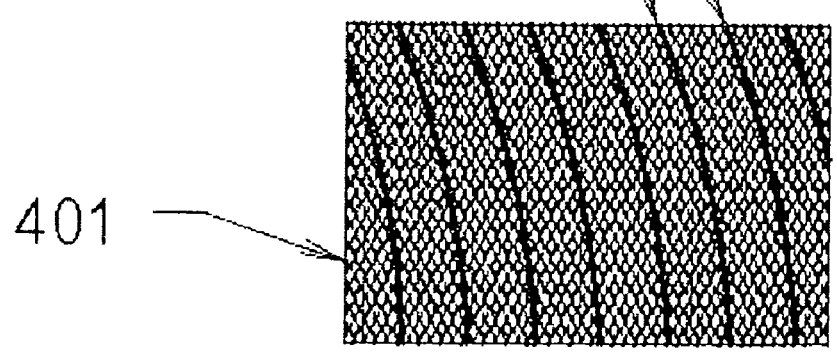

In this invention, and as shown in FIGS. 4A (perspective) and 4B (side), either prior to making the preslug, or prior to the final compression of the preslug, or both, one or more hoop wires 107 are wrapped around the outside of the tube and/or the preslug 401 (as the case may be). This wrapping can include a single wire wrapped helically around the girth as shown in these figures, multiple wires wrapped around the girth, one or more wire bands placed around the girth, and any combination thereof. The one or more hoop wires are secured to the tube and/or the preslug preferably by crimping, but any method which secures the hoop wire until and through the next compression step is suitable. Although shown darker and thicker in these figures for ease of illustration, the hoop wire can be the same as or different than the wire used in the mesh, with respect independently to each of diameter, cross-sectional geometry, and composition. Typically, the hoop wire, in all respects, will be the same as the wire used for the mesh.

During compression, the loops of the mesh physically interlock (by physical deformation) and hold each other in place. When the hoop wire is around the outside of the tube or the preslug, or both, during the compression (and deformation of the mesh) the hoop wire becomes interlocked in place with the mesh. The hoop wire, having a more consistently circumferential orientation than the mesh, provides increased hoop strength to the filter.

Figure 2:
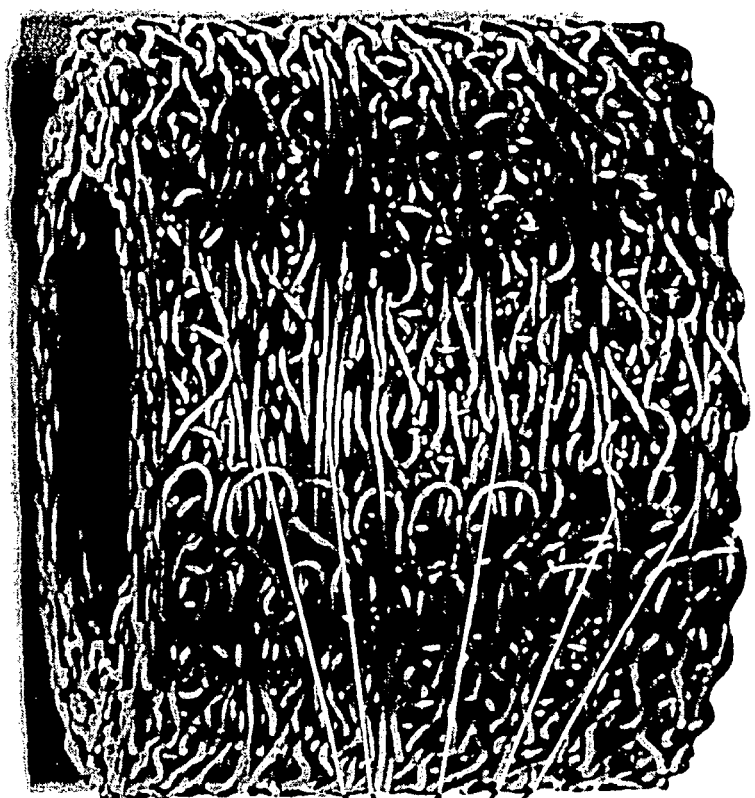
FIG. 2 is a side view of the filter shown in FIG. 1.

FIGS. 1 and 2 are photographs of a filter with a structure and made according to this invention. FIG. 1 is essentially a plan view of the device. A wire mesh has been compression molded into the filter 101 in the geometry of an annulus having an outer wall 103 and an inner wall 105 defining the annular opening. FIG. 2 is a side photographic view of the device seen in FIG. 1 wherein a wire 107 has multiple turns around the outside of the filter.

Figures 3A, 3B:
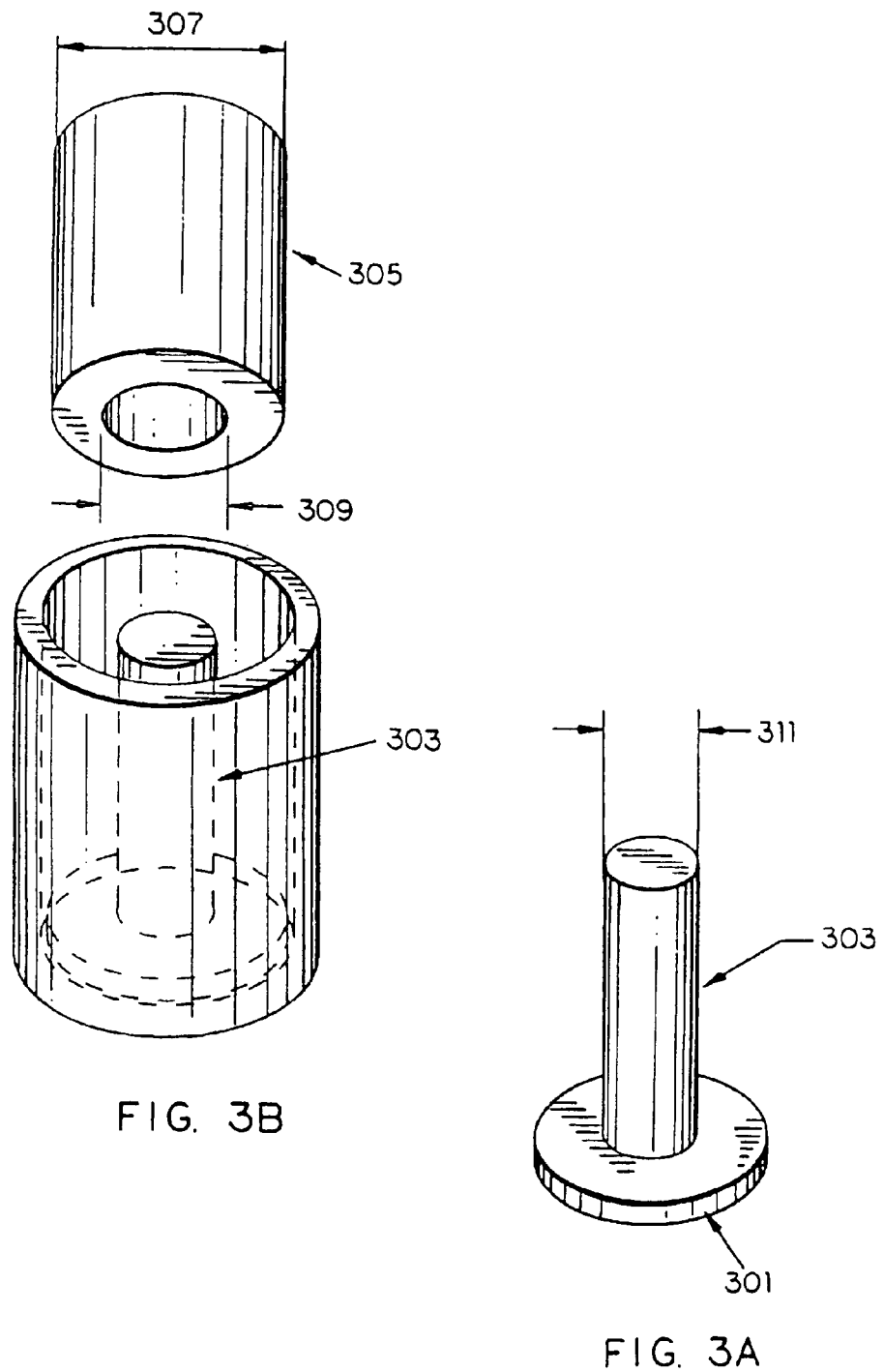

The mold in which the compression is performed is preferably made of a hard tool steel. The apparatus used for the molding is shown also in FIGS. 3A and 3B. In particular, FIG. 3A depicts a mandrel for use with this invention. The mandrel has a disk shaped base 301 to which a mandrel 303 is attached orthogonally in the center. The size of the base should be such that it can be fit securely into the bottom of the female mold, as shown in FIG. 3B. The knit mesh tube or the preslug is positioned over the mandrel that is positioned in the female mold cavity, and the sleeve plunger 305 is pressed into the mold. The plunger has an outer diameter 307 that corresponds with the inner diameter of the female mold, and an inner diameter 309 corresponding with the outer diameter 311 of the mandrel.

In certain embodiments it may be desirable to have a relatively long compressed mesh article that is too long for the mold, or a mold of the desired length would be too expensive. In such cases, multiple annular compressed mesh articles can be joined end to end, preferably by means of a joint. The preferred joint is a tongue-and-groove configuration, wherein the preslug would have a tongue in one end and a groove in the other. This can be accomplished by altering the configuration of the base of the mandrel and the working end of the plunger. In particular, a circular groove or ridge can be formed in the mandrel base so that when the wire mesh is forced thereagainst by the plunger, a tongue or groove (respectively) will be formed in the corresponding abutting end of the compressed mesh article. The working end of the plunger is then modified accordingly to have the opposite configuration of a ridge or groove, thereby forming a groove or tongue in the opposite end of the compressed mesh article. Thus, compressed mesh articles formed this way have a circular groove on one end and a circular tongue on the other, and so can be joined end to end to provide a longer (axially) article. Alternatively, the tongue and groove can be broken into fragments (arc segments) that act like slots and tabs for connecting two compressed filters together.

In addition, the mesh filters can have external ribs on the outer periphery, extending axially, as described and shown in U.S. Pat. No. 6,277,166 (mentioned above). As shown in FIGS. 3C-3E, a tool is used to make a filter having ribs in which the ribs extend along only a portion of the axial length of the filter. The tool has a female mold 303 with in inner bore 300, preferably having two inner annular circumferences 325 and 327. One of the annular circumferences includes a plurality of grooves or channels 329 spaced equally about the circumference and extending parallel with the axis of the mold (orthogonal to the circumference). As the mesh filter is forced into the tool by the plunger, the channels deform the outer perimeter of the filter so that the mesh occupies the whole of the internal cavity of the molding tool. Thereafter the filter with the ribs is removed from the molding tool.

When the compressed mesh articles of this invention are used as airbag filters, the airbag manufacturer provides a "can" into which the mesh filter is inserted, and into the annulus of the filter the explosive charge is loaded (with a primer) and the can is sealed. The can includes a number of vent holes through which the gas generated escapes, and the holes are usually sealed with paper as a barrier (e.g., against water penetration). Prior to the invention of the above-mentioned '166 patent, the manufacturer would have to insert a locator plenum into the can to locate the position of the filter, and then around the filter a welded, perforated tube would be inserted to provide increased hoop strength. The plenum is used not only to locate the filter but also to assure that the filter does not touch the walls of the can and compromise the seals of the holes in the can. This invention, like that of the '166 patent, eliminates both the locator plenum and the perforated tube from the manufacturing process, providing a significant cost savings and ease of manufacturing.

The novel articles of this invention are also suitable for making mesh substitutes for mechanical attenuation of movement, especially for absorbing energy, restricting movement, or providing a flexing motion. These articles are thus useful as substitutes for rubber bushings and flextubes (flexible cylindrical or annular devices for connecting conduits).

COMPARATIVE EXAMPLES

The instant filters were tested against filters not having hoop wires disposed on the outer surface in order to determine the relative effect of the hoop wire on the hoop strength.

The part tested was similar to that shown in FIGS. 1 and 2 and had properties as follows: 13.0 mm ID, 39.9 mm OD, 57.0 mm length, 200.0 g in weight, 41.1% dense, and made from 0.020"Ø Carbon Steel (194 g) with a hoop wire wrap of 0.023"Ø Black Oxide Carbon Steel (6 g) around the OD. The outer wrap of hoop wire was started on one end, wrapped 3 times on the end in the same spot and then traversed toward the other end (wrapped helically) with a spacing of approximately 4 mm between wraps; when the other end was reached, the wire was again wrapped three times in the same spot on the other end.

An Instron 5882 was used for the testing in combination with one of two expanding lathe mandrels (available from MSC Direct, Melville, N.Y.), one that expanded from about 1.3 mm ($\frac{1}{2}$ inch) to about 1.4 mm ($\frac{9}{16}$ inch) and another that expanded from about 1.4 mm ($\frac{9}{16}$ inch) to about 1.7 mm ($\frac{21}{32}$ inch). The expanding mandrel was inserted into the ID of the test part. The Instron device was programmed to forcibly expand the mandrel and to record the force required for expansion as a function of the expansion or deflection of the mandrel.

Figure 5:
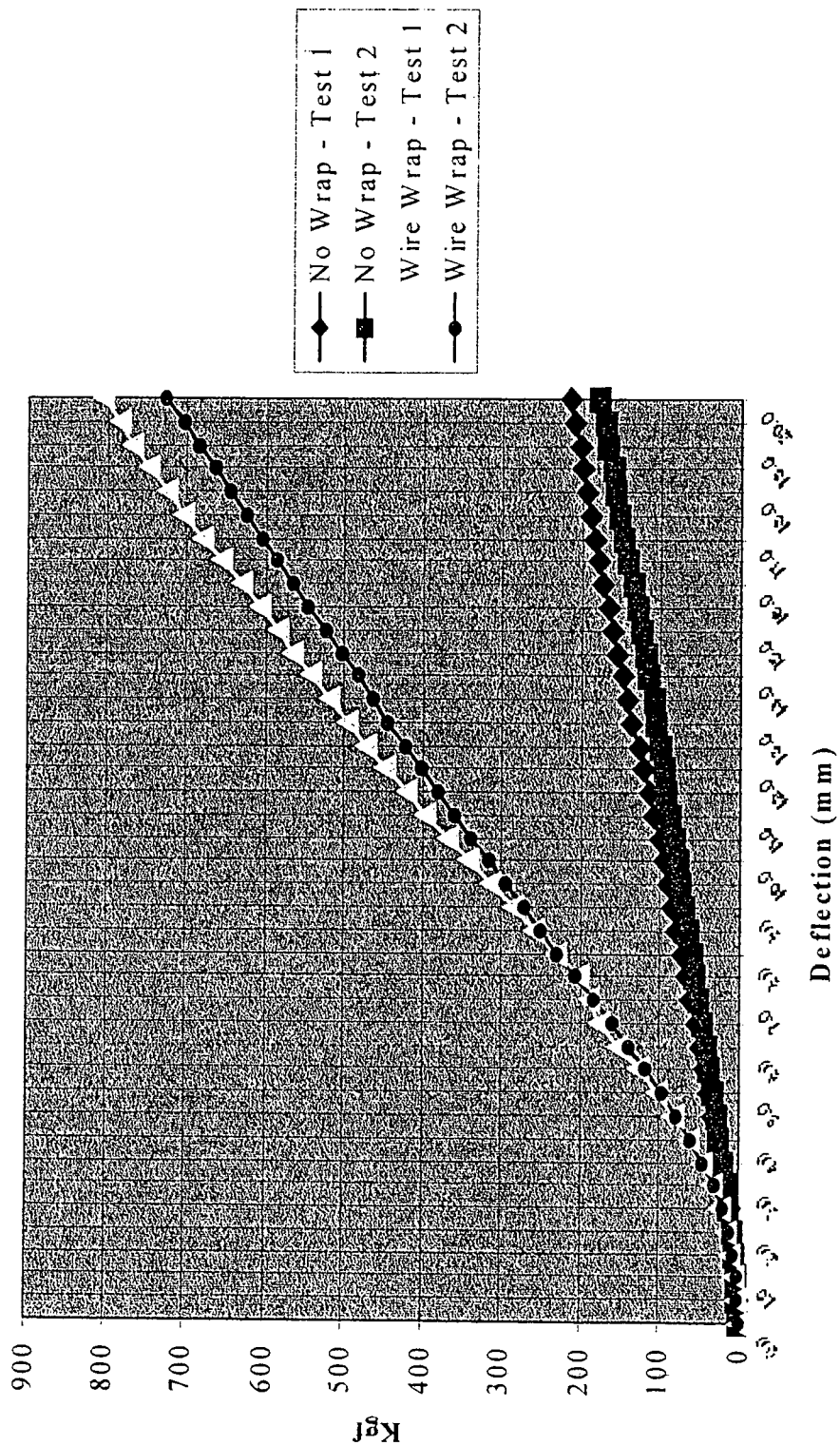

In FIG. 5 is shown the results using the first mandrel, having expanded from 1.3 mm to 1.4 mm and FIG. 6 shows the results of the other mandrel, having expanded from 1.4 mm to 1.7 mm. The results are shown in "deflection" (in mm), as penetration of the mandrel into the sleeve, versus the force (in kgf) required to achieve the penetration shown. As seen in both figures, after about a 3 mm deflection in FIG. 5 and after about a 5 mm deflection in FIG. 6, the wrapped mandrels required a significantly greater force for a given deflection in respect of the control sample that was otherwise identical but not wrapped with a hoop wire.

Although the penetration was done slowly, these results are at least partly simulative of the functioning of the device during the explosive deployment of an airbag. During deployment, an explosive charge in the ID of the filter is ignited and the expanding gases exert a significant force on the ID of the filter as the gases penetrate through the filter and inflate the airbag. The increased hoop strength evident from this testing means that there is no need to use perforated or expanded metal bands to increase the hoops strength.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A method for making a filter, comprising: knitting a wire into a tubular mesh having an outer wall; taking a predetermined amount of the knitted mesh and placing the same in a mold, and compressing the mesh to make a filter, wherein at least one hoop wire is wound around the outer wall prior to compressing.

2. The method of claim 1, wherein the tubular mesh has two ends, the mesh being placed in a female mold and compressing a first time along the axis of the tube against a first of said ends to make a preslug, the preslug then removed from the mold and said first end inserted first into said mold, and then compressing a second time against the second end.

3. The method of claim 2, wherein the hoop wire is wrapped around the tubular mesh.

4. The method of claim 2, wherein the hoop wire is wrapped around the preslug prior to the second compressing time.

5. The method of claim 4, wherein a first hoop wire is wrapped around the mesh prior to the first compressing time and a second hoop wire is wrapped around the preslug prior to the second compressing time.

6. The method of claim 2, wherein the mold has grooves effective to create at least one rib along the outside of the compressed filter.

7. A method for making a filter comprising:
   (a) winding at least one hoop wire around an outer wall of a knitted wire tubular mesh; and
   (b) compressing the tubular mesh to make a filter.

8. The method of claim 7 wherein:
(i) the tubular mesh has first and second ends,
(ii) the tubular mesh is placed in a female mold and compressed a first time along the axis of the tube against the first end,
(iii) the tubular mesh is removed from the mold and inserted into a female mold with the first end being inserted first, and
(iv) the tubular mesh is compressed a second time against the second end.

9. The method of claim 8 wherein the hoop wire is wrapped around the tubular mesh prior to the first compressing.

10. The method of claim 8 wherein the hoop wire is wrapped around the tubular mesh prior to the second compressing.

11. The method of claim 8 wherein a first hoop wire is wrapped around the tubular mesh prior to the first compressing and a second hoop wire is wrapped around the tubular mesh prior to the second compressing.

* * * * *